Patented Mar. 7, 1933

1,900,517

UNITED STATES PATENT OFFICE

RICHARD PASTERNACK, OF BROOKLYN, AND WILLIAM RALPH GILES, OF RICHMOND HILL, NEW YORK, ASSIGNORS TO CHARLES PFIZER & COMPANY, OF BROOKLYN, NEW YORK, A CORPORATION OF NEW JERSEY

HIGHLY SOLUBLE CALCIUM GLUCONATE AND PROCESS OF MAKING SAME

No Drawing. Application filed July 6, 1931. Serial No. 549,101.

This invention relates to highly soluble calcium gluconate and to the process of making same.

The normal solubility of calcium gluconate in cold water is about 3.5 to 3.9%. For many purposes, solutions of much higher concentration are desirable.

It is known that ordinary calcium gluconate is much more soluble in hot water, and that the excess does not immediately precipitate out upon cooling. However, the process of preparing such a supersaturated solution is cumbersome, and is not entirely reliable since the presence of a small amount of seeding material may cause it to precipitate rapidly.

Highly soluble calcium gluconate can not be prepared by simple dehydration. If a hot concentrated solution of calcium gluconate is poured into anhydrous alcohol, there results an amorphous precipitate which is soluble when fresh, but upon standing and when heated to remove adhering solvent, it reverts to its original form.

A dehydration of a concentrated solution cannot be accomplished by direct heating, as charring occurs long before the water is eliminated.

We have now found that it is possible to prepare calcium gluconate in a form readily soluble in cold water, and capable of giving concentrations as high as 40%, by spraying a hot concentrated solution of calcium gluconate into a current of dry air at elevated temperatures, thus effecting a very rapid dehydration.

Example 100 grams of crystalline calcium gluconate $Ca(C_6H_{11}O_7)_2 \cdot H_2O$ are dissolved in 500 cc. of water at 90–100° C., and sprayed by means of an atomizer into a current of dry air at about 145° C., the temperature depending upon the type of drier used. It may be higher with an apparatus that gives more rapid drying. Any standard type of spray dryer, having sufficient capacity to deliver the powder in a completely dry condition, may be used.

A more dilute solution than that specified in the example may be used, although obviously it will reduce the thermal efficiency of the drying process. A more concentrated solution is apt to clog the spraying apparatus. The temperature range of the solution may also be varied, but best results are obtained at 90–100° C.

The calcium gluconate prepared according to this process, is amorphous. It has a positive heat of solution; that is the temperature of the water rises as the soluble calcium gluconate dissolves. A 40% solution does not begin to precipitate for about 30 minutes, and solutions of less concentration will remain stable for a longer period.

We claim as our invention:

1. As a new product, highly soluble calcium gluconate, capable of forming a cold aqueous solution of up to 40% concentration.

2. As a new product, spray-dried, highly soluble calcium gluconate, capable of forming a cold aqueous solution of up to 40% concentration.

3. As a new product, highly soluble amorphous calcium gluconate in the form of a dry powder, and capable of forming a cold aqueous solution of up to 40% concentration.

4. As a new product, spray-dried amorphous calcium gluconate which is highly soluble in cold water, and capable of forming therewith a solution of up to 40% concentration.

5. As a new product, highly soluble calcium gluconate, capable of forming a 40% solution with cold water.

6. Process for the preparation of highly soluble calcium gluconate which comprises spray-drying a hot solution of calcium gluconate at elevated temperatures.

7. Process for the preparation of highly soluble calcium gluconate which comprises spray-drying a hot, concentrated solution of calcium gluconate at elevated temperatures.

8. Process for the preparation of highly soluble calcium gluconate which comprises spraying a hot concentrated solution of calcium gluconate into a current of dry air at about 145° C.

9. Process for the preparation of highly soluble calcium gluconate in the form of a dry powder which comprises dissolving calcium gluconate in water at between 90–100° C., and spraying the solution into a current of dry air at about 145° C.

10. Process for the preparation of highly soluble calcium gluconate in the form of a dry powder which comprises dissolving 100 grams of crystalline calcium gluconate in 500 cc. of water at 90–100° C., and spraying the solution into a current of dry air at about 145° C.

Signed at Brooklyn, in the county of Kings and State of New York, this 2nd day of July A. D. 1931.

RICHARD PASTERNACK.
WILLIAM RALPH GILES.